Patented Oct. 1, 1946

2,408,421

UNITED STATES PATENT OFFICE 2,408,421

WATER INSOLUBLE AZO DYESTUFFS CONTAINING AN N-MORPHOLINO-ARYLIDE GROUP

Harry Wilhelm Grimmel, Easton, and Alfred Guenther, Riegelsville, Pa., assignors to General Aniline & Film Corporation, New York, N. Y., a corporation of Delaware No Drawing. Application October 19, 1944, Serial No. 559,478

6 Claims. (Cl. 260—152)

This invention relates to water-insoluble azo dyestuffs and to the fiber dyed therewith. More particularly it relates to azo dyestuffs of the general formula:

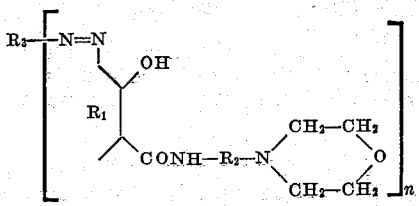

wherein $R_1$] represents a radical of the group consisting of the naphthalene, anthracene, carbazole, benzo-carbazole, diphenylene oxide, diphenylene sulfide, fluorene and fluorenone radicals, $R_2$ represents a radical of the benzene series linked directly through a carbon atom of the benzene ring with the nitrogen atom of both the amido and morpholine groups, $R_3$ represents the radical of a diazotized aromatic amine, e. g., the phenyl, naphthyl, anthranyl, biphenylene, carbazole, fluorene, etc., radicals, and $n$ represents one of the numbers 1 and 2. The radicals $R_2$ and $R_3$ may contain substituents such as alkyl, alkoxy, halogen, the nitro group and the like, for example, the methyl, ethyl, methoxy, ethoxy, chlorine and trifluoromethane groups, etc., but not water-solubilizing groups such as a sulfonic acid or carboxylic acid group.

Our new dyestuffs may be obtained by coupling in the usual manner in substance, on the fiber or on a substratum adapted for the production of lakes, diazo compounds of aromatic amines with arylides of orthohydroxy carboxylic acids wherein the aryl radical to which the nitrogen atom of the amido group is attached is substituted by the morpholine group and which have the general formula:

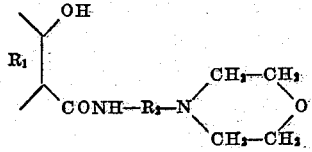

wherein $R_1$] and $R_2$ have the aforesaid significance. These arylides are described and claimed in our copending application Serial No. 559,479, filed October 19, 1944.

The new dyestuffs are particularly valuable for printing in that the reduced substantivity of the arylide components thereof, brought about by the presence of the morpholine group, renders the arylides easily removable from the unprinted areas of the goods padded therewith. In contrast, analogous arylides not so substituted by the morpholine group are hard to remove. The dyestuffs generally yield orange to blue and brown shades, those prepared in substance or on the fiber by the usual methods being distinguished by good fastness properties.

The arylides of the above general formula may be prepared by any of the methods known for amide formation for example, by the action of the acid halide, or acid ester of the desired orthohydroxy carboxylic acid, e. g., 2-hydroxy-3-naphthoic acid or the orthohydroxy carboxylic acids of carbazole, benzo-carbazole, diphenylene oxide, etc., on the aromatic amine containing the substituent morpholine group, by the action of the orthohydroxy carboxylic acid or its sodium salt on the amine or its salt with the aid of phosphorus trichloride or phosphorus oxychloride as condensing agent, by the action of the orthohydroxy carboxylic acid on isocyanates, or in any other manner found suitable. Preferably, they are produced by reacting the sodium salt of the acid with the amine in an inert solvent such as toluene using phosphorus trichloride as condensing agent.

The morpholine substituted aromatic amines may be prepared in known manner, for example, by condensing ortho or para nitrochlorbenzene compounds with morpholine at elevated temperatures, with subsequent reduction of the nitro compounds.

The invention is further illustrated by the following specific examples to which, however, it is not to be limited.

Example 1

Well boiled cotton yarn is impregnated with a solution containing 1 g. per liter of an arylide of the following formula:

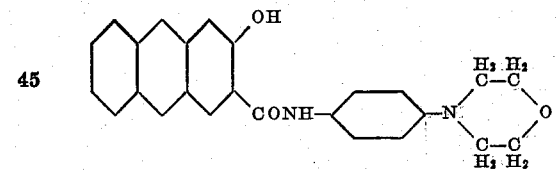

10 cc. of caustic soda solution of 34° Bé. and 10 cc. of Turkey red oil of 50 per cent strength, well squeezed, and developed with a developing solution which has been rendered feebly acid with acetic acid and containing per liter the diazo compound from 2 g. of 3-amino-5-benzoylamino- 1.4-hydroquinone diethyl ether. A greenish blue dyeing of good fastness properties is obtained.

Example 2

Desized and bleached cotton piece goods are padded on a foulard with a solution containing per liter 18 g. of the arylide of the following formula:

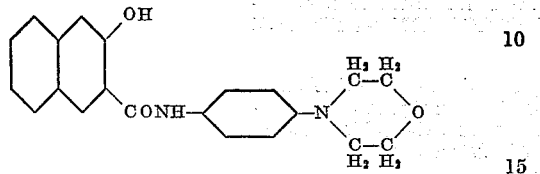

22.5 cc. of caustic soda solution of 34° Bé. and

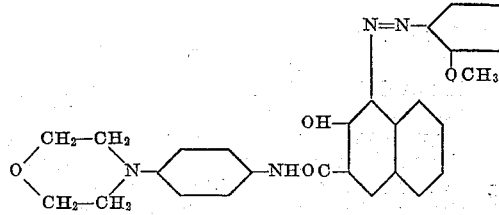

22.5 cc. of Turkey red oil. The impregnated and dried material is then passed through a developing solution which contains per liter the diazo compound from 13.5 g. of 3-amino-4-chlor benzo trifluoride and is weakly acid with acetic acid. An orange dyeing with good fastness to light is obtained.

Example 3

Desized and bleached cotton goods are printed with a paste containing the arylide

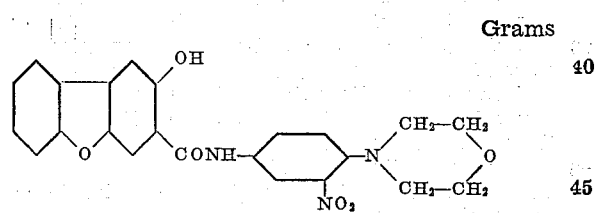

|  | Grams |
|---|---|
|  | 33 |
| The stabilized diazo-amino compound of 3-amino-N,N-diethyl-4-methoxy benzene sulfonamide, calculated as pure base | 21 |
| Caustic soda solution, 34° Bé | 30 |
| Turkey red oil, 50 per cent strength | 15 |
| Alcohol | 15 |
| Neutral starch, tragacanth thickening to | 1000 |

The printed material, dried if desired, is exposed to the fumes of an acid ager for several minutes, subsequently rinsed, soaped at the boil, rinsed and dried. A brown print of good fastness to light is obtained. The dyestuff has the formula:

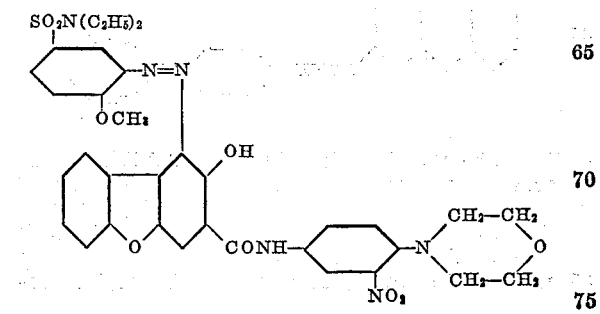

Example 4

Desized and bleached cotton goods are printed as in Example 3 with the exception that the paste contains 32 grams of the arylide

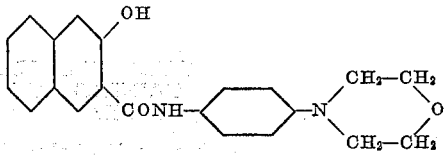

and 21 grams, calculated as pure base, of the stabilized diazoamino compound of dianisidine. A blue print of good fastness to light is obtained. The dyestuff has the formula:

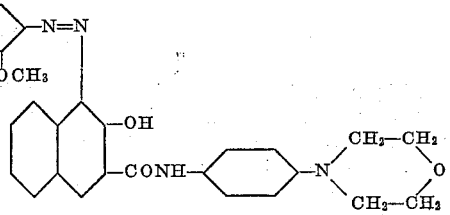

Fast prints are also obtainable by using according to known methods a stable nitrosamine instead of a stabilized diazoamino compound.

Example 5

16.8 parts 2-amino-5-nitro anisol are diazotized in the usual manner and the diazo solution is coupled with a solution of 35 parts by weight of 2-hydroxy-3-naphthoyl p-amido phenyl morpholine (formula in Example 2) in dilute caustic soda solution to which there have been added the amount of sodium acetate sufficient for binding the excess mineral acid, and Turkey red oil. The precipitated dyestuff is filtered and washed well. When worked up with a substratum in the usual manner, advantageously in the form of a paste, it yields a dark red lake of good fastness to light.

We claim:

1. Water-insoluble azo dyestuffs of the general formula:

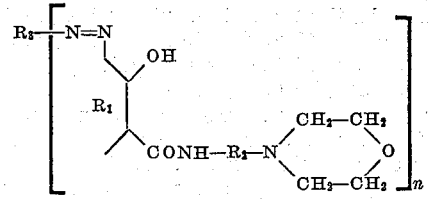

wherein $R_1$ represents a radical of the group consisting of the naphthalene, anthracene, carbazole, benzo-carbazole, diphenylene oxide, diphenylene sulfide, fluorene and fluorenone radicals; $R_2$ represents a radical of the benzene series linked directly through a carbon atom of the benzene ring with the nitrogen atom of both the amido and morpholine groups; $R_3$ represents an aromatic radical, the radicals $R_2$ and $R_3$ being free from water-solubilizing groups, and $n$ is one of the numbers 1 and 2.

2. Water-insoluble monoazo dyestuffs of the general formula:

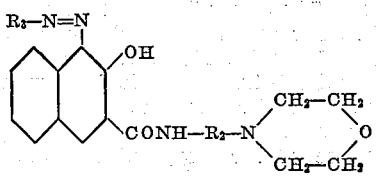

wherein $R_2$ represents a radical of the benzene series linked directly through a carbon atom of the benzene ring with the nitrogen atom of both the amido and morpholine groups and $R_3$ represents an aromatic radical, the radicals $R_2$ and $R_3$ being free from water-solubilizing groups.

3. Water-insoluble monoazo dyestuffs of the general formula:

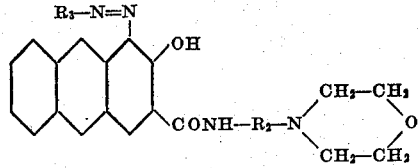

wherein $R_2$ represents a radical of the benzene series linked directly through a carbon atom of the benzene ring with the nitrogen atom of both the amido and morpholine groups and $R_3$ represents an aromatic radical, the radicals $R_2$ and $R_3$ being free from water-solubilizing groups.

4. Water-insoluble monoazo dyestuffs of the general formula:

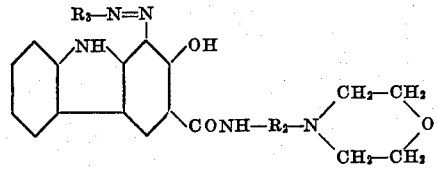

wherein $R_2$ represents a radical of the benzene series linked directly through a carbon atom of the benzene ring with the nitrogen atom of both the amido and morpholine groups and $R_3$ represents an aromatic radical, the radicals $R_2$ and $R_3$ being free from water-solubilizing groups.

5. Water-insoluble monoazo dyestuffs of the general formula:

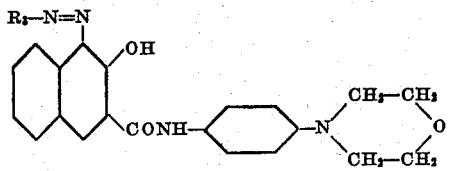

wherein $R_3$ is an aromatic radical free from water-solubilizing groups.

6. The water-insoluble monoazo dyestuff of the formula:

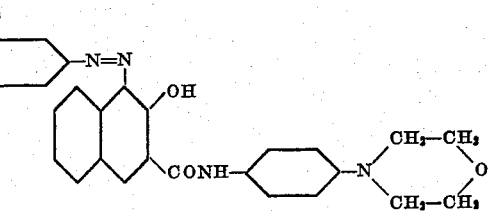

HARRY WILHELM GRIMMEL.
ALFRED GUENTHER.